United States Patent
Johnston

(10) Patent No.: US 10,066,300 B2
(45) Date of Patent: Sep. 4, 2018

(54) ENHANCED RELEASE COMPRESSION SHOE FOR USE WITH CONCRETE PRODUCT FORMING MACHINES

(71) Applicant: Columbia Machine, Inc., Vancouver, WA (US)

(72) Inventor: Llewellyn L. Johnston, Vancouver, WA (US)

(73) Assignee: COLUMBIA MACHINE, INC., Vancouver, WA (US)

( * ) Notice: Subject to any disclaimer, the term of this patent is extended or adjusted under 35 U.S.C. 154(b) by 252 days.

(21) Appl. No.: 15/214,246

(22) Filed: Jul. 19, 2016

(65) Prior Publication Data

US 2018/0021979 A1 Jan. 25, 2018

(51) Int. Cl.

| | |
|---|---|
| C23C 18/32 | (2006.01) |
| C23C 18/16 | (2006.01) |
| C23C 18/26 | (2006.01) |
| B29C 33/56 | (2006.01) |
| B28B 3/02 | (2006.01) |
| B22C 3/00 | (2006.01) |
| B29C 73/00 | (2006.01) |
| B28B 1/08 | (2006.01) |
| B28B 7/08 | (2006.01) |
| B29C 45/56 | (2006.01) |
| B29C 37/00 | (2006.01) |
| B28B 3/06 | (2006.01) |
| B28B 11/14 | (2006.01) |
| B29C 45/37 | (2006.01) |

(52) U.S. Cl.
CPC ............. *C23C 18/32* (2013.01); *B22C 3/00* (2013.01); *B28B 1/08* (2013.01); *B28B 3/022* (2013.01); *B28B 3/06* (2013.01); *B28B 7/08* (2013.01); *B28B 11/14* (2013.01); *B29C 33/56* (2013.01); *B29C 37/0032* (2013.01); *B29C 45/37* (2013.01); *B29C 45/568* (2013.01); *B29C 73/00* (2013.01); *C23C 18/1637* (2013.01); *C23C 18/1692* (2013.01); *C23C 18/26* (2013.01)

(58) Field of Classification Search
CPC ....... B29C 73/00; B29C 45/568; B29C 33/56; B29C 37/0032; B29C 45/37; B28B 1/08; B28B 3/022; B28B 7/08; B28B 11/14; B22C 3/00; C23C 18/32; C23C 18/26; C23C 18/1637
USPC ................ 264/31, 36.2, 69, 71, 297.9, 338; 425/424, 425, 431, 444; 427/133, 135, 427/230–239, 305, 438
See application file for complete search history.

(56) References Cited

U.S. PATENT DOCUMENTS 5,445,514 A * 8/1995 Heitz .................... B28B 7/0097
249/114.1

* cited by examiner

*Primary Examiner* — William P Fletcher, III
(74) *Attorney, Agent, or Firm* — Schaffer IP Law, LLC

(57) ABSTRACT

A compression shoe for use on a concrete products forming machine comprises a main body and a plated layer overlaid on the main body. The main body is configured to be slidingly received within a mold cavity of a concrete products mold. The plated layer overlaid on the main body of the compression shoe comprises a uniform electroless nickel (Ni), phosphorus (P), and polytetrafluoroethylene (PTFE) nano dispersion coating to effect enhanced material release characteristics by preventing the build-up of material on the compression shoes and enhancing their wear characteristics.

17 Claims, 4 Drawing Sheets

ENHANCED RELEASE COMPRESSION SHOE FOR USE WITH CONCRETE PRODUCT FORMING MACHINES

BACKGROUND OF THE INVENTION

1. Field of the Invention

This invention relates generally to concrete products forming machines (CPMs) and more particularly to compression shoes used in such machines that form molded products.

2. Description of the Prior Art

Prior art machines for forming concrete products within a mold box include a product forming section comprising a stationary frame, an upper compression beam and a lower stripper beam. The mold assembly includes a head assembly that is mounted on the compression beam, and a mold box that is mounted on the frame and receives concrete material from a feed drawer. An example of such a system is shown in U.S. Pat. No. 5,807,591 which describes an improved concrete products forming machine (CPM) assigned in common to the assignee of the present application and herein incorporated by reference for all purposes.

Current production process consists of a mold containing forming cavities in which concrete material is filled. During each machine cycle, a pallet is brought in contact with the bottom surface of the mold, closing the bottom side of the cavities. Concrete material is deposited into the top of each cavity and then vibrated to concentrate the material. During this cycle a compression shoe is inserted into the top surface of the cavities which then compresses further and forms the top of the concrete material to a specific surface configuration.

Conventional compression shoes are comprised of case hardened steel that is machined precisely to fit the cavity opening and to create a specific shape characteristic into the top formed surface of the concrete material. The compression shoe when contacting the top surface of the concrete material causes concrete material to adhere to the contact surface. This adherence can build up during the multiple cycle process causing the original surface to be altered and the concrete product being formed to have inferior appearance.

A known method for addressing the build-up of concrete on the compression shoe during multiple cycles is to apply heat to the compression shoe to elevate the temperature adequately to hydrate the surface tension between the compression shoe and the concrete material during the forming process. This method, however, is highly energy inefficient since heating energy must be constant applied to the compression shoes, thus elevating the temperature of the work environment as well as possibly degrading the lifetime of the shoe.

Accordingly, there is need for alternate methods for preventing the build-up of material on the compression shoes and enhancing their wear characteristics.

SUMMARY OF THE INVENTION

The invention comprises utilizing a plated layer overlaid on the main body of the compression shoe. This plated layer is comprised of an electroless nickel, phosphorus, polytetrafluoroethylene (Ni—P-PTFE) Nano dispersion coating. Electroless nickel's ability to plate uniformly makes this coating ideal for surfaces that have texture that are not compromised by the additional coating layer. The release characteristic is further improved with the introduction of PTFE. During the co-deposit process, Teflon particles are actually plated along with the electroless nickel and become part of the plated coating itself. This provides for greatly enhanced lubricity throughout the life of the coating. As the coating wears, new PTFE particles are continuously exposed. This process provides release enhancement of the forming surface no longer requiring heat to maintain the surface quality of the compression shoe.

Another characteristic of the Ni—P-PTFE plated surface is through heat treatment (approx. 400 C.) of the plated surface, after the plating process, to achieve a higher surface hardness for improved wear ability against the abrasiveness of the concrete mixture, therefore an improved compression shoe wear life.

Another aspect of the invention includes a method for making a molded concrete product within a mold box of a type having an array of cavities. The method comprises first lifting a pallet against an underside of the mold box so that it seals bottom openings of the mold box cavities. The array of cavities within a mold box are then filled with concrete material. Once the cavities are filled with concrete compression shoes are then lowered into top openings of the mold box cavities so that bottom surfaces of the compression shoes rest against and compress the top surface of the concrete material within the array of cavities. The bottom surfaces of the compression shoes are formed with a plating layer in contact with the concrete product formed of electroless nickel (Ni), phosphorus (P), and polytetrafluoroethylene (PTFE). The compression shoes are then lowered together with the pallet so that the concrete material is pressed in molded fashion out the bottom openings of the mold box cavities. The compression shoes are then lifted back out through the top openings of the mold box cavities once the molded concrete products are completely moved out from the cavities and onto the pallet. The process can then start again to produce additional sets of molded concrete products.

DETAILED DESCRIPTION

Figure 1:
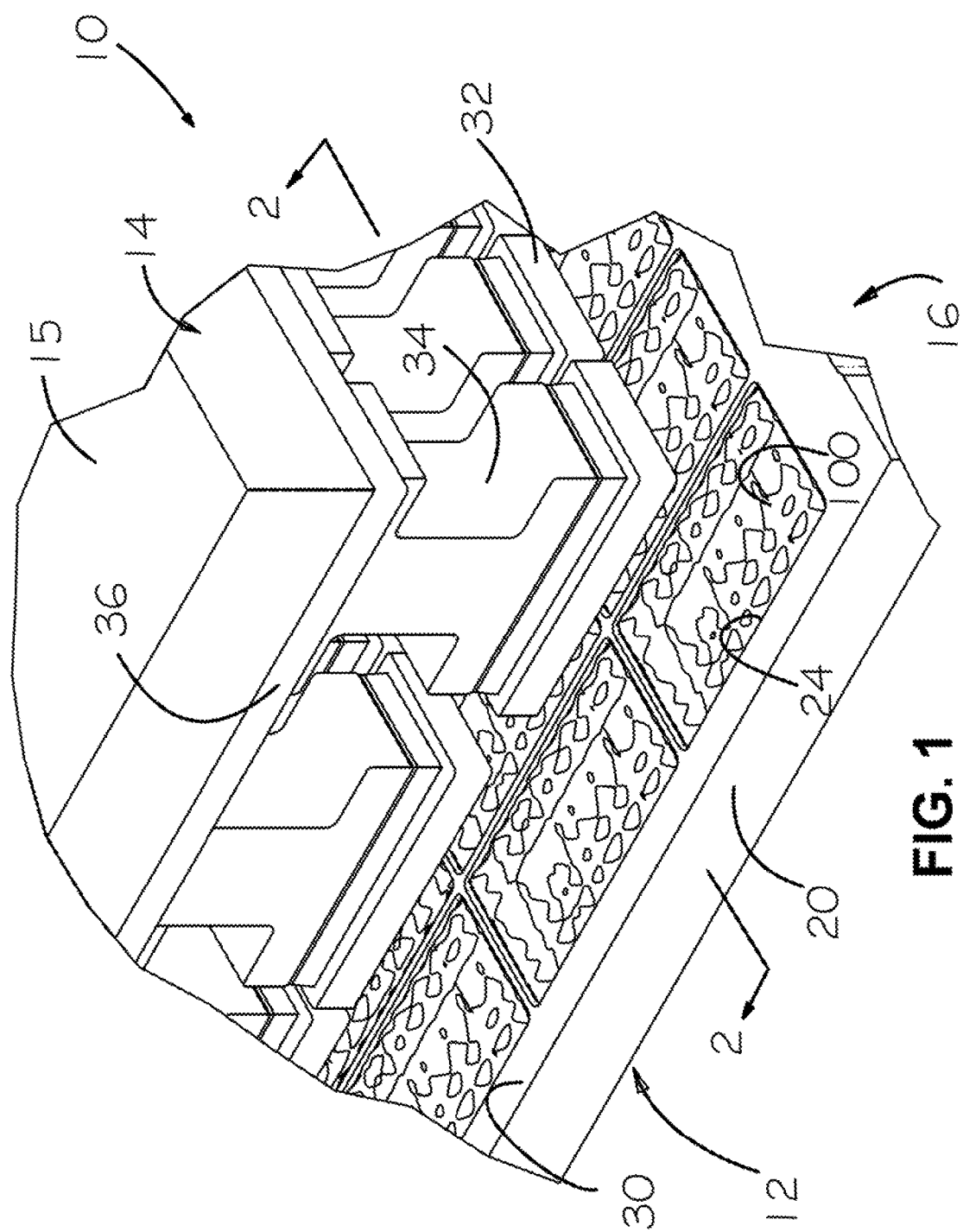
FIG. 1 is a perspective view of a head assembly of a concrete products forming machine that includes compression shoes implemented according to embodiments of the invention positioned over the filled cavities of a mold assembly.

FIG. 1 illustrates a mold assembly 10, including a mold box portion 12 and a head assembly portion 14 that are mounted together in alignment with one another onto a concrete products forming machine (CPM)—not shown—as described further below. Whereas the mold box 12 is mounted within a lower part of the concrete products machine, as by spanning across a pair of vibrationally enabled mounting shelves, the head assembly is coupled to a vertically moveable compression beam 15.

Mold box 12 is arranged with a particular configuration that dictates what type, size, and shape of molded product it is to produce. As such, mold box includes a body with a front wall 16 and a back wall (not shown) joined together with side walls 20, 22 and having an array of openings formed therein, e.g. cavity 24 (FIG. 2), for receiving and molding concrete material 100 into concrete products 200. The side walls 20, 22 each have a side face 26 that spans between a bottom facing surface 28 of the side face and a top facing surface 30 to form the dimensions of the cavities 24. These dimensions ultimately determine a size and shape of the molded concrete product 200 formed using the mold box 12, subject to a top surface profile or pattern imparted to the top of the concrete material 100 by a compression shoe 32 as described below.

The head assembly 14 includes multiple compression shoes 32, coupled vertically with respective head legs 34, that are shaped for slidingly inserting through a top side 30 of the mold assembly 12 and into the mold cavities 24. A top-mounted connector plate 36 couples head legs 34 and the shoes 32 together in registry with the cavities 24 of the mold assembly 12. The shoes 32 compress the concrete material 100 into a molding condition and push the molded concrete products 200 completely out a bottom side 28 of the mold box. The shoes 32 are then collectively raised and slidingly removed out the top side 30 of the mold box 12 so as to again expose the open tops of the cavities 24 and to allow the mold box to receive and mold additional concrete products. In this fashion, mold box 12 and head assembly 14 are constructed to form molded concrete products 200 having a certain size and configuration, whereas different mold boxes can have differently configured assemblies resulting in different products.

In use, the head assembly 14 is raised via the compression beam 15 of the CPM so as to expose the cavities 24. A feed drawer moves concrete material over the top of the mold box 12 and dispenses the material 100 into the contoured cavities 24 of the mold box. The preferred materials 100 used to form the concrete products 200 produced by methods of the present invention include zero slump concrete with a cement content of between about 14%-16% by weight. A pallet 38 is maintained against the underside of the mold cavities 24 during this filling step to prevent material from spilling out the bottom end of the mold box 12. The feed drawer typically includes an agitator assembly (not shown) within the drawer that operates to break up the concrete and improve its consistency prior to dropping it into the mold. As the concrete material is dispensed, a vibration system shakes the mold box to spread the concrete material evenly within the mold box cavities in order to produce a more homogeneous concrete product. A wiper assembly, mounted to the front of the feed drawer, then moves against the bottom surface of the compression shoes 32 to scrape excess concrete from the compression shoes 32 when the feed drawer is moved to an operative position above the mold box.

After the concrete 100 is dispensed into the mold cavities 24, the feed drawer retracts from over the top of the mold box. A spreader, bolted separately to the front of the feed drawer, scrapes off excess concrete from the top facing surface 30 of the mold box 12 when the feed drawer is retracted after filling the mold cavities 24. The result is that the cavities 24 of the mold box are completely filled with concrete 100 or some other moldable material as shown in FIG. 1.

After the cavities 24 are filled with concrete 100, the vertically moveable compression beam 15 and coupled head assembly 14 are lowered to an intermediate position so that the compression shoes 32 are pushed into the tops of corresponding cavities 24 in the mold box and against the top surface of the concrete material 100. The shoes compress the concrete material 100 during the vibration process and ensure that the top surface of a resulting concrete product 200 retains a top surface profile imparted by a bottom surface profile of the compression shoe as described further below.

With the shoes 32 at the top 30 of the mold box cavities 24 and against the top of the concrete 100, and with the pallet 38 held against the bottom of the concrete within the cavities, the mold is vibrated by the CPM to remove air pockets from within the molded product and to ensure that the concrete fills the entirety of the mold cavity, thus resulting in more uniform molded concrete products 200.

Figure 2:
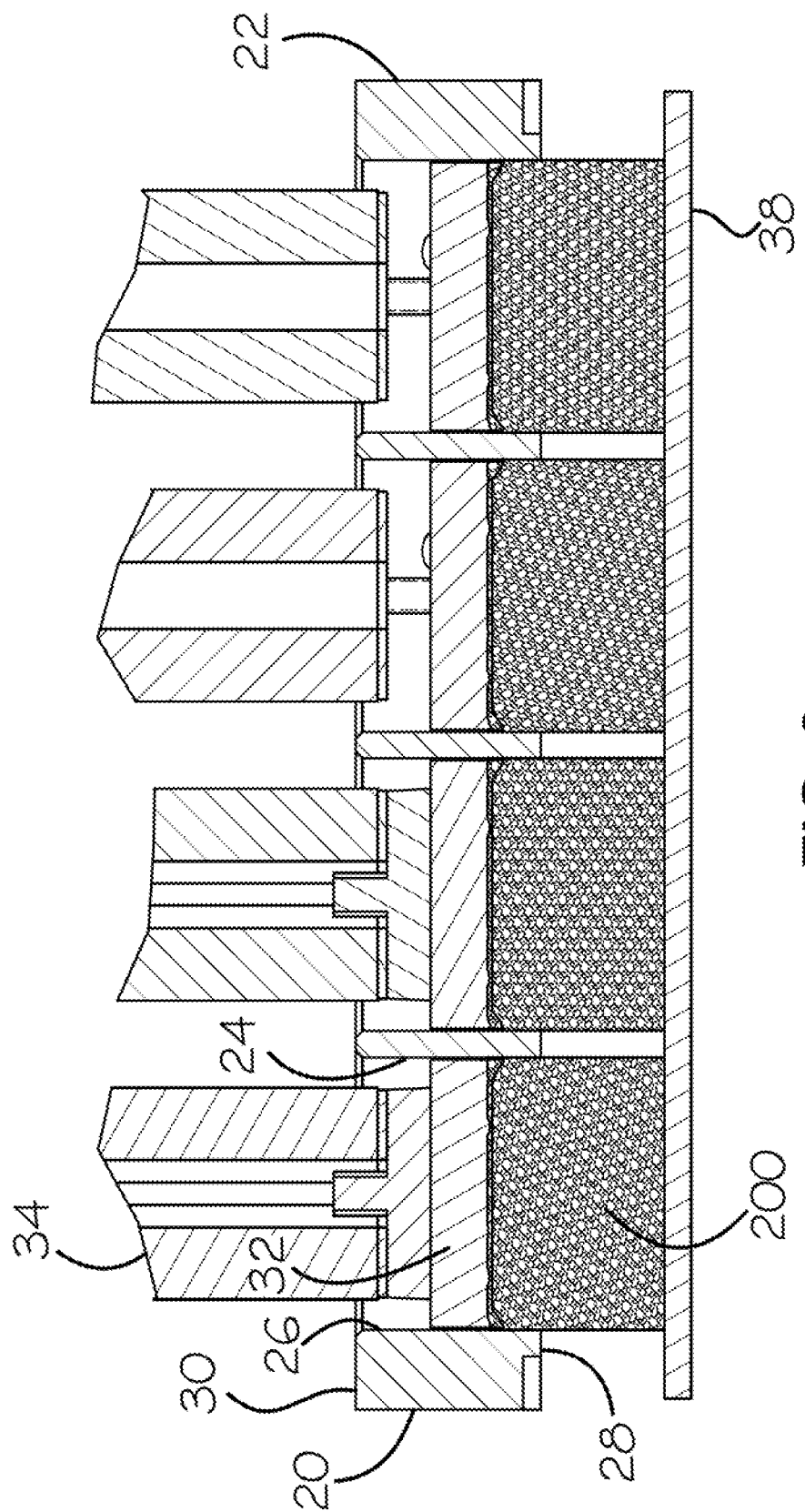
FIG. 2 is a side elevation sectional view taken along line 2-2 of FIG. 1 in a subsequent production process with the compression shoes partially inserted into the mold cavities and pushing the molded concrete products out the bottom end of the cavities.

After compression is complete, the pallet 38 is lowered via a stripper beam (not shown) as the head assembly 14 pushes further into the cavities 24 against the now-molded material 200 as shown in FIG. 2. The shoes 32 thus continue to compress the concrete products into a molding condition and push the molded concrete products 200 out a bottom side 28 of the mold assembly until the molded concrete products are fully removed from the cavities and sitting upon the pallet 38. The pallet is then removed and a new pallet moved into position, the shoes 32 slidingly removable back out the top side of the mold cavities 24, and the production cycle continued to allow the mold box to receive and mold additional concrete products.

The mold box and head assembly are matched together and configured to form concrete products in a specific shape, size, and number. Each product configuration requires a different mold. When the operator desires the CPM to produce products in different configurations, the mold assembly must be detached from mounts on the CPM and removed along with the assembly. A different mold box and head assembly must then be moved into place and mounted within the CPM.

As shown best in FIG. 2, and due to the nature of the molding process and the concrete materials used, the compression shoes 32 must be closely fitted within the cavity 24 dimensions. As the shoes 32 press against the top of the molded product 200 so as to force the product out the bottomside of the mold as shown in FIG. 2, the top surface of product can adhere to the shoe 32 as the shoe is retracted back up through the cavity 24 for the next production step. This results in a molded product having a defective top surface profile, which must therefore be rejected.

The present invention utilizes a plating layer atop the steel body of the compression shoes that reduces the adhesion with the molded material so as to prevent tear-away, as well as improves the durability of the shoes in an abrasive environment such as with molding concrete products.

Figure 3:
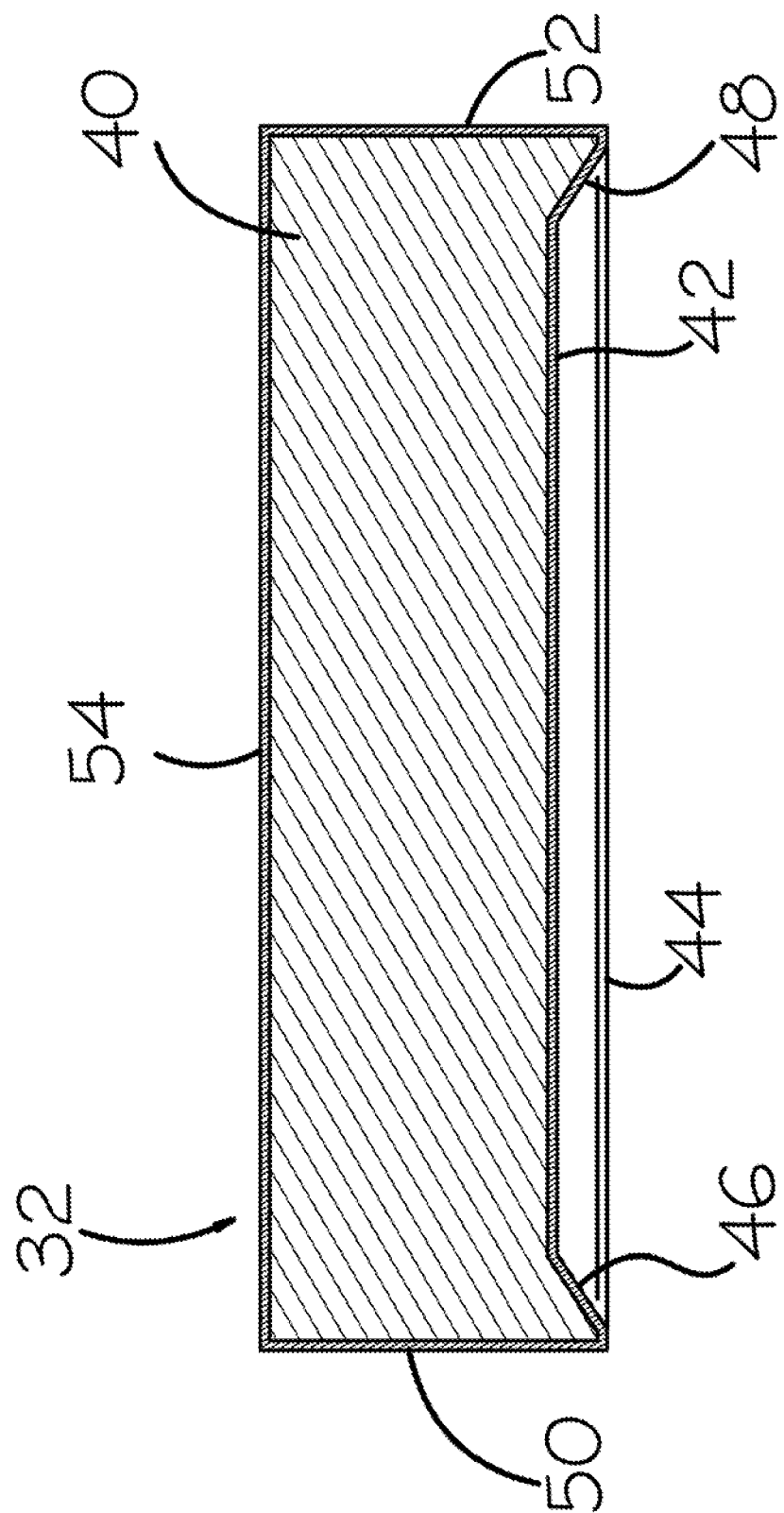
FIG. 3 is a sectioned side elevation view of a compression shoe constructed according to teachings of the invention.
Figure 4:
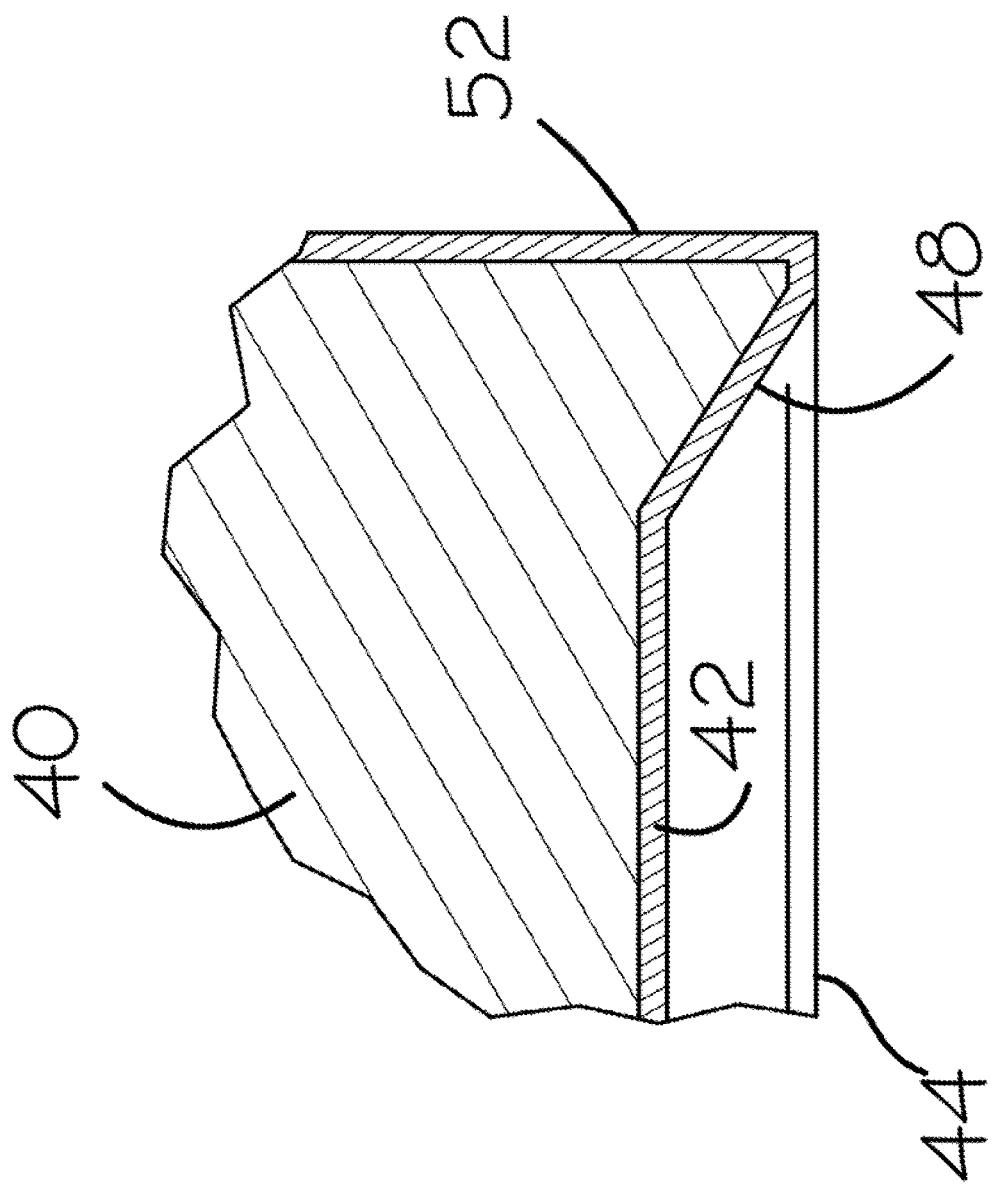
FIG. 4 is a magnified view of a portion of FIG. 3 showing a sectioned side elevation of the compression shoe side constructed according to teachings of the invention.

FIGS. 3 and 4 illustrate a compression shoe 32 of a type used in the present invention. Compression shoe 32 includes a main body 40 formed of a hard, durable, and relatively inexpensive material such as steel, e.g. carburizing steel with a carbon content of approximately 18%-20% that has been carburized and case hardened. A plated layer 42 is overlaid overtop the main body 60 of the compression shoe. Plated layer 42 is formed at least overtop a bottom 44 of the compression shoe 32 main body 40, as this is the surface that contacts the concrete material 100 during the molding process. However, the plated later 42 can also be formed overtop the side surfaces 50, 52 of the compression shoe main body 40 as well as overtop the top surface 54.

The bottom surface 44 of the compression shoe 32 can be imparted with a particular negative profile that is intended to be transferred to the molded concrete product 200. One example of this profile is shown in FIGS. 3 and 4, where upwardly angled peripheral surfaces 46, 48 formed in the bottom surface of compression shoe 32 form chamfered edge around the top peripheral surface of the molded concrete product 200.

This plated layer is preferably comprised of an electroless nickel, phosphorus, polytetrafluoroethylene (Ni—P-PTFE) nano dispersion coating. The rate of deposit of the plating later is constant and includes a plating thickness of between about 0.0022 to 0.006 inches. It has been discovered that electroless nickel's ability to plate uniformly makes this coating ideal for surfaces that have texture or a distinctive profile that are not compromised by the additional coating layer.

The release characteristic is further improved with the introduction of polytetrafluoroethylene (PTFE) also commonly known as Teflon. During the co-deposit process, Teflon particles are actually plated along with the electroless nickel and become part of the plated coating itself. This provides for greatly enhanced lubricity throughout the life of the coating. As the coating wears, new PTFE particles are continuously exposed. In a preferred embodiment, phosphorus is co-deposited with this Ni and PTFE materials at between a 2%-13% proportion, and preferably between about 10% infusion rate. This process provides release enhancement of the forming surface and no longer requires the continuous application of heat to maintain the surface quality of the compression shoe.

Another characteristic of the Ni—P-PTFE plated surface is through heat treatment (approx. 400 C.) of the plated surface, after the plating process, to achieve a higher surface hardness for improved wear ability against the abrasiveness of the concrete mixture, therefore an improved compression shoe wear life.

Having described and illustrated the principles of the invention in a preferred embodiment thereof, it should be apparent that the invention can be modified in arrangement and detail without departing from such principles. Other materials and processes may be used, such as EN-P infusion alone and not heat treated, EN-P-PTFE not heat treated, and various surface conditions before the coating process. We claim all modifications and variation coming within the spirit and scope of the following claims.

What is claimed is:

1. A method for forming a compression shoe for a concrete products machine comprising the steps of:
   providing a compression shoe having a main body configured to be slidingly received within a mold cavity of a concrete products mold; and
   applying a plated layer overlaid on the main body of the compression shoe comprising an electroless nickel (Ni), and polytetrafluoroethylene (PTFE) nano dispersion coating.

2. The method of claim 1, wherein the step of applying a plating layer includes forming the plated layer by co-depositing the electroless nickel simultaneously with the PTFE so that the PTFE is uniformly distributed throughout a depth of the plated layer.

3. The method of claim 2, wherein a rate of deposit on the main body is constant throughout the forming step.

4. The method of claim 2, further including a step of applying a heat treatment to the plating layer after the co-depositing step.

5. The method of claim 4, wherein the heat treatment is approximately 400° C.

6. The method of claim 1, further including the step of co-depositing a phosphorus (P) material together with the Ni and PFTE materials.

7. The method of claim 6, wherein the P material is co-deposited with the Ni and PTFE materials at an approximate 2%-13% infusion rate.

8. The method of claim 6, wherein the P material is co-deposited with the Ni and PTFE materials at an approximate 10% infusion rate throughout the forming step.

9. The method of claim 1, wherein the depth of the plating layer is between approximately 0.0022" and 0.006".

10. A compression shoe comprising:
    a main body configured to be slidingly received within a mold cavity of a concrete products mold; and
    a plated layer overlaid on the main body of the compression shoe comprising an electroless nickel (Ni), phosphorus (P), and polytetrafluoroethylene (PTFE) nano dispersion coating.

11. The compression shoe of claim 10, wherein the electroless nickel (Ni), phosphorus (P), and polytetrafluoroethylene (PTFE) are uniformly distributed throughout a depth of the plated layer.

12. The compression shoe of claim 11, wherein the P is comprised at an approximate 2%-13% infusion throughout the depth of the plated layer.

13. The compression shoe of claim 12, wherein the P is comprised at an approximate 10% infusion throughout the depth of the plated layer.

14. The compression shoe of claim 10, wherein the plating layer has a thickness of between approximately 0.0022" and 0.006".

15. The compression shoe of claim 10, wherein the plating layer is only formed overtop a bottom surface of the compression shoe.

16. The compression shoe of claim 10, wherein the compression shoe includes a bottom surface having a non-planar profile configured to impart a negative image of the non-planar profile onto a top surface of a molded concrete product produced by the concrete products forming machine, the plated layer being laid overtop the non-planar profile.

17. A method for making a molded concrete product within a mold box having an array of cavities, the method comprising:
    lifting a pallet against an underside of the mold box so that it seals bottom openings of the mold box cavities;
    filling the array of cavities within a mold box with concrete material;
    inserting compression shoes into top openings of the mold box cavities so that bottom surfaces of the compression shoes rest against and compress the top surface of the concrete material within the array of cavities, the bottom surfaces having a plating layers in contact with the concrete product formed of electroless nickel (Ni), phosphorus (P), and polytetrafluoroethylene (PTFE);
    lowering the compression shoes and pallet together so that the concrete material is pressed in molded fashion out the bottom openings of the mold box cavities; and
    lifting the compression shoes back out through the top openings of the mold box cavities once the molded concrete products are completely moved out from the cavities and onto the pallet.

* * * * *